(12) United States Patent
Thomas

(10) Patent No.: US 7,377,159 B2
(45) Date of Patent: May 27, 2008

(54) METHODS AND SYSTEM FOR DETERMINING ANGLES OF ATTACK AND SIDESLIP USING FLOW SENSORS

(75) Inventor: Steven H. Thomas, Brooklyn Center, MN (US)

(73) Assignee: Honeywell International Inc., Morristown, NJ (US)

( * ) Notice: Subject to any disclaimer, the term of this patent is extended or adjusted under 35 U.S.C. 154(b) by 164 days.

(21) Appl. No.: 11/205,241

(22) Filed: Aug. 16, 2005

(65) Prior Publication Data

US 2007/0251313 A1   Nov. 1, 2007

(51) Int. Cl.
*G01P 13/00* (2006.01)

(52) U.S. Cl. ............... 73/170.02; 73/180; 73/170.11

(58) Field of Classification Search ............. 73/170.02, 73/180; 244/17.13
See application file for complete search history.

(56) References Cited

U.S. PATENT DOCUMENTS

| | | | |
|---|---|---|---|
| 3,819,135 A | 6/1974 | Foxworthy et al. | |
| 4,378,696 A | 4/1983 | DeLeo et al. | |
| 4,615,213 A | 10/1986 | Hagan | |
| 4,836,019 A | 6/1989 | Hagen et al. | |
| 5,205,169 A * | 4/1993 | Hagen | 73/180 |
| 5,369,993 A | 12/1994 | Hagan | |
| 5,442,958 A * | 8/1995 | Hagen | 73/170.02 |
| 5,466,067 A * | 11/1995 | Hagen et al. | 374/138 |
| 5,616,861 A | 4/1997 | Hagen | |
| 5,628,565 A * | 5/1997 | Hagen et al. | 374/143 |
| 5,710,705 A * | 1/1998 | Eckert | 701/83 |
| 5,731,507 A * | 3/1998 | Hagen et al. | 73/182 |
| 5,852,237 A * | 12/1998 | Renshaw | 73/180 |
| 6,253,166 B1 | 6/2001 | Whitmore et al. | |
| 6,352,223 B1 * | 3/2002 | Larramendy | 244/177 |
| 6,609,421 B2 | 8/2003 | Cronin et al. | |
| 6,685,143 B1 | 2/2004 | Prince et al. | |
| 6,772,976 B1 | 8/2004 | Rouse et al. | |
| 2006/0027702 A1 * | 2/2006 | Rouse et al. | 244/17.13 |
| 2006/0101923 A1 * | 5/2006 | Hager et al. | 73/861.63 |

* cited by examiner

*Primary Examiner*—Andre J. Allen

(57) ABSTRACT

A system for determining angle of attack and angle of sideslip of an air vehicle is described. The system includes a plurality of mass flow sensors, at least a portion of which are mounted to result in a differential in air flow across the respective mass air flow sensors. The system also includes a controller configured to receive signals from the flow sensors and determine at least one of the angle of attack and the angle of sideslip for the air vehicle.

20 Claims, 4 Drawing Sheets

Three mass flow sensors:
1. α
2. β
3. total flow

METHODS AND SYSTEM FOR DETERMINING ANGLES OF ATTACK AND SIDESLIP USING FLOW SENSORS

BACKGROUND OF THE INVENTION

This invention relates generally to flight control systems that are incorporated into air vehicles, and more specifically, to methods and systems for determining angle of attack and angle of sideslip using flow sensors.

Angle of attack (AOA) and angle of sideslip (AOS) are parameters used by aircraft, missiles, and unmanned aerial vehicles (UAVs) for flight control. Angle of attack is the angle between an airfoil chord line and the relative wind. Angle of sideslip is the angle between the airfoil chord line and the flight path. In current systems there are two ways in which AOA and AOS are sensed. In a first method, separate mechanical AOA and AOS probes are used that protrude from the air vehicle. In the second method, a combination of either six precision absolute pressure sensor transducers or two precision absolute pressure sensors and two precision differential pressure sensors are used.

Both of the above described solutions for determining AOA and AOS are high cost, and both are complex in that they require high precision sensors, precision modeling algorithms, and complex controller software and electronics. In addition to the high cost, these systems are of excessive size and weight and therefore are not typically suitable for small, emerging air vehicles such as missiles and UAVs.

BRIEF SUMMARY OF THE INVENTION

In one aspect, a system for determining angle of attack (AOA) and angle of sideslip (AOS) of an air vehicle is provided. The system comprises a plurality of mass flow sensors, at least a portion of which are mounted to result in a differential in air flow across the respective mass air flow sensors, and an electronic controller configured to receive signals from the flow sensors. The controller is configured to produce digital electrical signals representative of the angle of attack and the angle of sideslip for the air vehicle.

In another aspect, a method for determining one or more of AOA and AOS for an air vehicle is described. The method comprises receiving air flow data from a plurality of mass air flow sensors, at least a portion of which are positioned to result in a differential in air flow across the portion of the sensors, and determining, using a controller, at least one of the angle of attack and the angle of sideslip for the air vehicle from the received air flow data.

In still another aspect, a mass air flow sensor system is provided that comprises a probe, a plurality of mass air flow sensors, and a controller. The probe comprises a plurality of flow ports formed therein, where a first plurality of these flow ports is positioned to create a differential airflow therethrough based on an angle of attack of an air vehicle, and a second plurality of these flow ports is positioned to create a differential airflow therethrough based on an angle of sideslip of the air vehicle. The plurality of mass air flow sensors includes a first of the mass air flow sensors positioned within a path created between the first plurality of the flow ports and a second positioned within a path created between the second plurality of the flow ports. The controller is configured to receive signals from the flow sensors and determines at least one of the angle of attack and the angle of sideslip for the air vehicle based on the differential mass air flows through the flow ports.

DETAILED DESCRIPTION OF THE INVENTION

Figure 1:
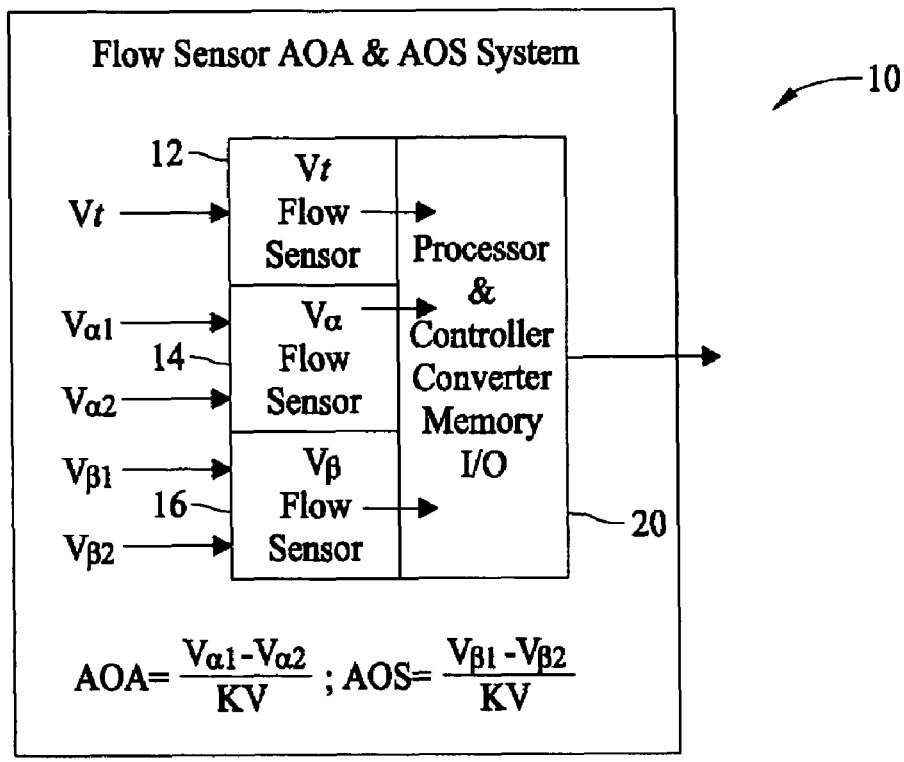
FIG. 1 is a block diagram of a system for determining angle of attack (AOA) and angle of sideslip (AOS) for an air vehicle.

FIG. 1 is a block diagram of a system 10 configured to determine angle of attack (AOA) and angle of side slip (AOS) for an air vehicle. Specifically, system 10 determines AOA and AOS using three small, light weight, and low cost mass flow sensors 12, 14, and 16. As a result, the system costs of system 10 are significantly lower than conventional pressure sensor based AOA and AOS systems. While system 10 is configurable for use in air vehicles and other high end applications, system 10 is also affordable, which allows for utilization in low cost missiles and unmanned aerial vehicles (UAVs).

System 10 further includes a processor 20 which receives flow data from flow sensors 12, 14, and 16. While referred to herein as processor 20, those of ordinary skill will recognize that processor 20, in alternative embodiments, will include memory, and/or input/output controller functionality so that processor 20 can provide AOA and AOS data to external systems, and alternatively user interfaces (e.g., displays) within an air vehicle.

Still referring to FIG. 1, flow sensor 12 is configured for utilization in determining an AOA and provides data relating to a differential in airflow through flow ports as described below. Flow sensor 14 is configured for utilization in determining an AOS and also provides data relating to a differential in airflow through respective flow ports. As illustrated, the differential air flow data is provided to processor 20. Flow sensor 16 is configured as a total air flow sensor and provides data to processor 20 that allows for the elimination of the variability of the flow of the air mass into the AOA and AOS ports as a function of pressure and temperature.

In one embodiment, flow sensors 12, 14, and 16 incorporate microbridge technology, such that flow sensors 12, 14, and 16 are configured to operate in harsh environments. In addition, flow sensors 12, 14, and 16 are capable of sensing extended air mass flow rates of more than 30 grams per square centimeter per second. In one embodiment, flow sensors have a range of 1000:1 (i.e. the sensors can sense mass flow rates from 30 gm/cm2/sec to 0.030 gm/cm2/sec). Flow sensors 12, 14, and 16 are also bi-directional, that is, they can measure flow in both directions.

Microbridge mass air flow sensors measure actual mass flow of a gas media. Actual flow is driven by a pressure gradient flowing from a higher pressure region to a lower pressure region. Sensors 12, 14, and 16 measure air mass flow which is a function of the gas density, the gas density being a function of pressure and temperature. Sensors 12, 14, and 16, in one embodiment, are compensated for temperature and therefore do not vary as a function of temperature due to altitude changes.

Figure 2:
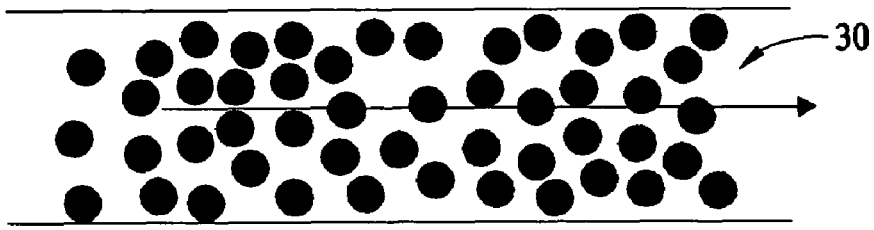
FIG. 2 is a diagram of molecules at a lower temperature and high pressure.
Figure 3:
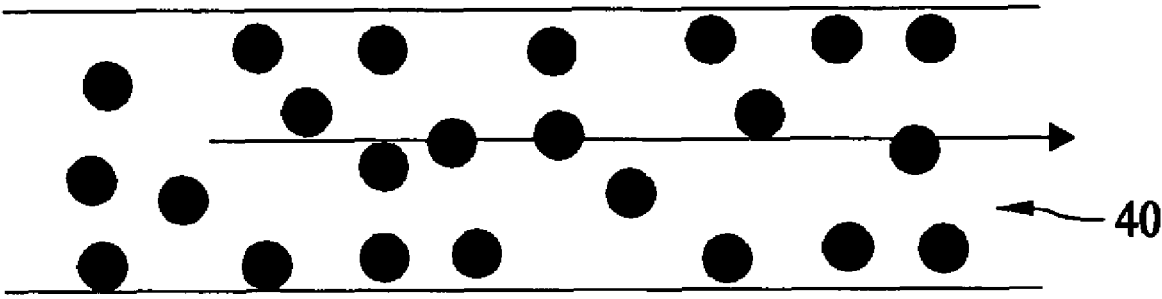
FIG. 3 is a diagram of molecules at a higher temperature and a low pressure.

FIG. 2 is a diagram illustrating the flow of molecules 30 at low temperature or higher pressure, such as would be found at lower altitudes. To keep mass flow constant, volumetric flow, in cubic centimeters/second has to be decreased. FIG. 3 is a diagram illustrating the flow of molecules 40 at a higher temperature or lower pressure, such as would be found at higher altitudes. To keep mass flow constant, volumetric flow, in cubic centimeters/second has to be increased.

Mass flow sensor 12, 14, and 16 translate to air flow sensors using the following equation:

$$Q = \overline{m}nRT/mP,$$

where the mass flow rate of air, $\overline{m}$, is measured. The other variables are: n=1, R=82.1 cm$^3$ atm/mole °K, m=mass of air in grams per one mole, P=Pressure in atmospheres (e.g., a function of altitude), and T=temperature in Kelvin (e.g., a function of altitude and impact temperature).

For air, the mass can be calculated based on its composite makeup, in mass/mole, e.g., about 78.8% nitrogen ($N_2$) which is about 28.01 grams per mole, and about 21.2% oxygen ($O_2$) which is about 32.00 grams per mole. For this calculation the approximate 0.9% of argon, and 0.03% of carbon dioxide in the air can be ignored, and the result is that air is about 28.854 grams per mole.

The relationship between pressure and altitude is:

$Ps = Po(1 - 6.875586 \times 10^{-6} \text{ Hp})^{5.25596}$; for Hp<36089.238 ft, and $Ps = 6.68322 \times \exp[-4.806(\text{Hp} - 36089.238)]$; for 36089.238 ft<Hp<65616.7977 ft. Static temperature, in Kelvin, can be approximated from the following equation:

$$T = (-0.00189 \times \text{altitude} + 15) + 273.15.$$

In one embodiment, pressure is determined, for example, utilizing GPS altitude and then calculating the pressure using the equations above. However, errors relative to GPS altitude are considered in alternative embodiments.

Figure 4:
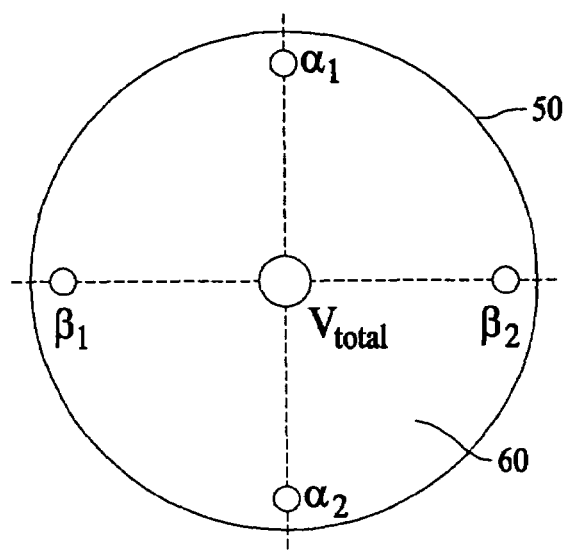
FIG. 4 is an end view of a hemispherical probe illustrating the installation of a mass flow sensor system on its surface.
Figure 5:
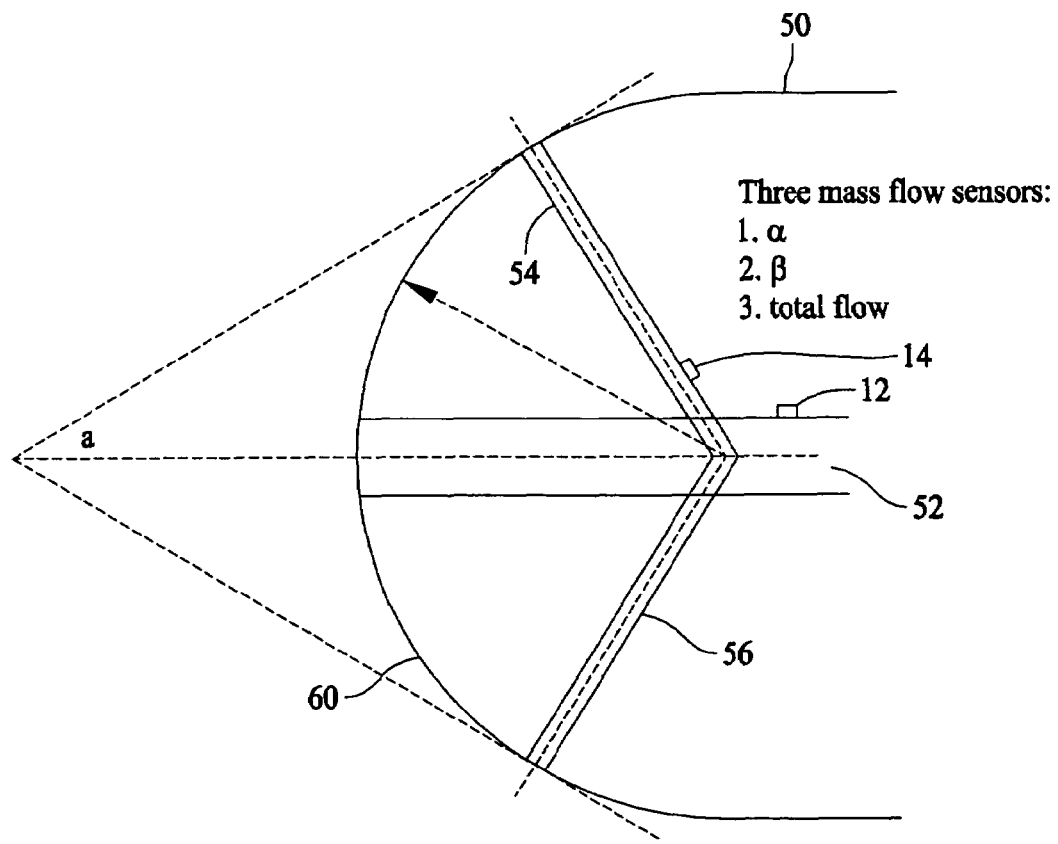
FIG. 5 is a side view of the hemispherical probe of FIG. 4.

FIG. 4 is a diagram illustrating the installation of mass flow sensors on a surface, for example, of a hemispherical probe 50. Angle of attack (AOA) ports are indicated as $\alpha_1$ and $\alpha_2$. Angle of sideslip (AOS) ports are indicated by $\beta_1$ and $\beta_2$. A total flow port is indicated by $V_{total}$. FIG. 5 is a side view of hemispherical probe 50 and further illustrates a flow path 52 for $V_{total}$, and flow path portions 54 and 56 for AOA ports $\alpha_1$ and $\alpha_2$ respectively.

By placing the ports (e.g., the $\alpha_1$, $\alpha_2$, $\beta_1$, and $\beta_2$ ports) in precise locations on a surface, for example, on surface 60 of hemispherical probe 50, then differential air flow can be measured by the respective flow sensors 14 and 16 and the differential results are proportional to AOA and AOS for the air vehicle (i.e., AOA is proportional to $V\alpha_1 - V\alpha_2$, and AOS is proportional to $V\beta_1 - V\beta_2$, where V is a velocity).

Figure 6:
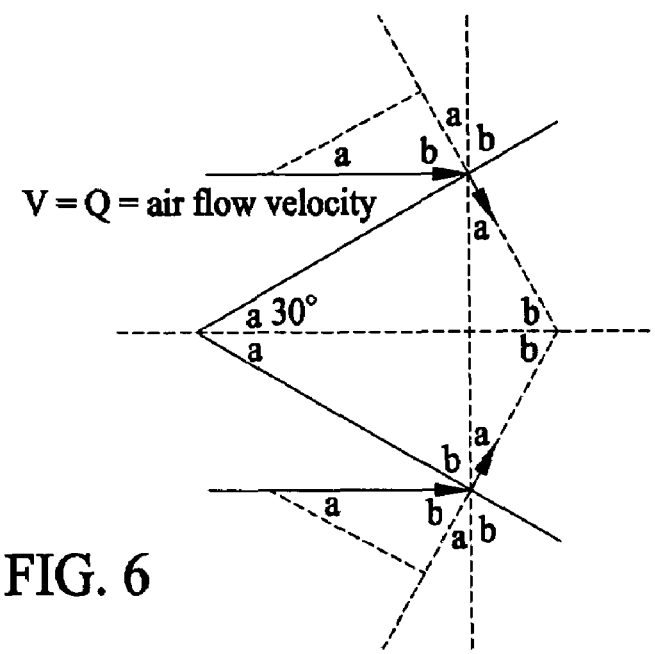
FIG. 6 shows various angles between flow ports and a mass air flow path for an AOA of zero degrees.
Figure 7:
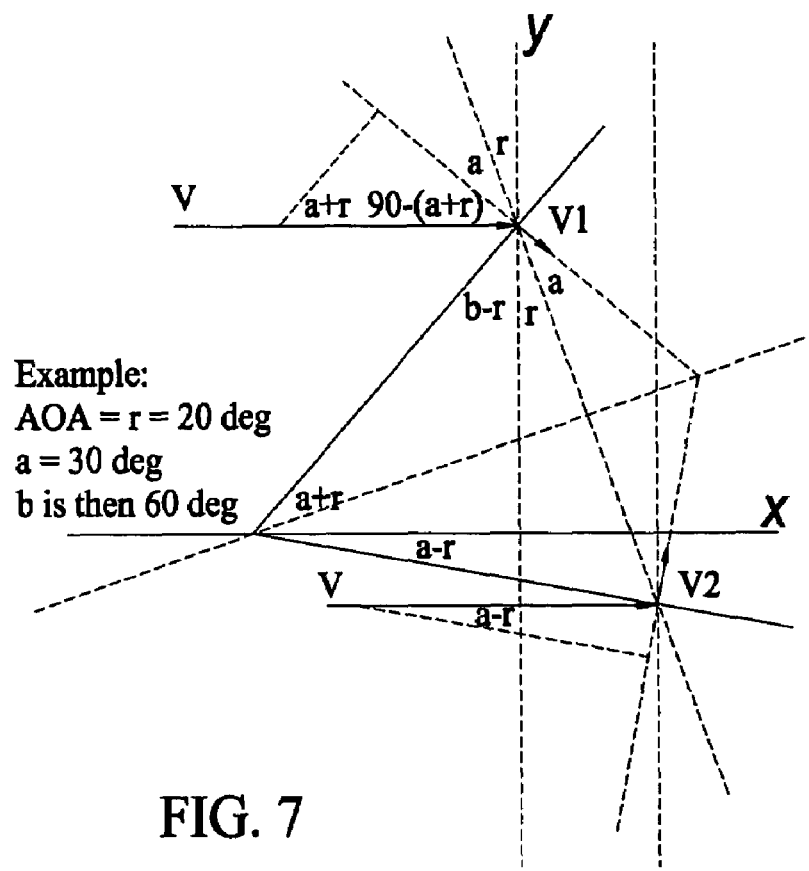
FIG. 7 illustrates the changes in the angles between flow ports and an mass air flow path resulting from a negative AOA.

FIG. 6 shows various angles between flow ports and an air mass flow path for an AOA of zero degrees. As illustrated, the AOA ports (i.e. $\alpha_1$ and $\alpha_2$ ports) are at a thirty degree slope (denoted by angle a). With an AOA of zero degrees, then $V\alpha_1 = V\alpha_2$, as the same amount of air mass is flowing into each respective flow port. When the vehicle rotates down (i.e. a negative AOA), then the resultant $V\alpha_1$ becomes greater than $V\alpha_2$, as more air mass flows into the $\alpha_2$ port, and the difference (i.e. $V\alpha_1 - V\alpha_2$) is proportional to AOA, as shown in FIG. 7. Likewise, this same scenario is applicable to AOS when the vehicle rotates sideways with an angle of sideslip. With an AOS of zero degrees, then $V\beta_1 = V\beta_2$, as the same amount of air mass is flowing into each respective flow port. When the vehicle rotates left (i.e. a negative AOS), then the resultant $V\beta_1$ becomes greater than $V\beta_2$, as more air mass flows into the $\beta_2$ port, and the difference (i.e. $V\beta_1 - V\beta_2$) is proportional to AOS.

The variability of $V\alpha$ and $V\beta$ as a function of pressure altitude and temperature can be eliminated by adding another flow sensor to measure the total flow (i.e. $V_{total}$ shown in FIGS. 4 and 5) and then using a ratiometric measurement. The AOA and AOS for an air vehicle is then derived directly utilizing the following ratio:

$AOA = (V\alpha_1 - V\alpha_2)/kV_{total}$ and $AOS = (V\beta_1 - V\beta_2)/kV_{total}$, where k is a function of the angle of the flow ports, more specifically, the angle between the total flow port, $V_{total}$, and the individual flow ports (the $\alpha_1$, $\alpha_2$, $\beta_1$, and $\beta_2$ ports).

The above described embodiments for determining AOA and AOS provide a low cost, and simple solution for the determination of AOA and AOS which can be utilized in small air vehicles such as missiles drones, and other UAVs. In addition to the low relative cost, as compared to pressure sensor based systems, the above described embodiments are relatively small in size and weight and therefore are especially suitable for small air vehicles of the type above described.

While the invention has been described in terms of various specific embodiments, those skilled in the art will recognize that the invention can be practiced with modification within the spirit and scope of the claims.

What is claimed is:

1. A system for determining angle of attack and angle of sideslip of an air vehicle, said system comprising:
 a plurality of mass air flow sensors, at least a portion of which are mounted to result in a differential in air flow across respective said mass air flow sensors; and
 a controller configured to receive signals from said flow sensors and determine at least one of the angle of attack and the angle of sideslip for the air vehicle.

2. A system according to claim 1 further comprising a plurality of flow ports, a first portion of said flow ports positioned to create a differential air flow across one of said sensors to determine an angle of attack for the air vehicle, a second portion of said flow ports positioned to create a differential air flow across another of said sensors to determine an angle of sideslip for the air vehicle.

3. A system according to claim 2 wherein to determine an angle of attack for the air vehicle, said processor is configured to determine $V\alpha_1 - V\alpha_2$, which is a difference in the air mass flow entering the $\alpha_1$ and $\alpha_2$ flow ports and proportional to an angle of attack for the air vehicle.

4. A system according to claim 2 wherein to determine an angle of sideslip for the air vehicle, said processor is configured to determine $V\beta_1 - V\beta_2$, which is a difference in the air mass flow entering the $\beta_1$ and $\beta_2$ flow ports and proportional to an angle of sideslip for the air vehicle.

5. A system according to claim 2 wherein one of said flow ports comprises a total air mass flow port, said system configured to determine an angle of attack for an air vehicle according to $AOA = (V\alpha_1 - V_2)/kV_{total}$, where $V\alpha_1 - V\alpha_2$ is a difference in the air mass flow entering the $\alpha_1$ and $\alpha_2$ flow ports, k is a function of the angle between the total flow port, $V_{total}$ and the individual $\alpha_1$ and $\alpha_2$ flow ports.

6. A system according to claim 2 wherein one of said flow ports comprises a total air mass flow port, said system configured to determine an angle of sideslip for an air vehicle according to $AOS = (V\beta_1 - V\beta_2)/kV_{total}$, where $V\beta_1 - V\beta_2$ is a difference in the air mass flow entering the $\beta_1$ and $\beta_2$ flow ports, k is a function of the angle between the total flow port, $V_{total}$ and the individual $\beta_1$ and $\beta_2$ flow ports.

7. A system according to claim 2 further comprising a hemispherical probe, said flow ports positioned on a surface of said probe.

8. A method for determining one or more of angle of attack and angle of sideslip for an air vehicle, said method comprising:
   receiving air flow data from a plurality of mass air flow sensors, at least a portion of which are positioned to result in a differential in air flow across the portion of the sensors;
   determining, using a controller, at least one of the angle of attack and the angle of sideslip for the air vehicle from the received air flow data; and
   providing the at least one of the angle of attack and the angle of sideslip to at least one of an external system and an external user interface.

9. A method according to claim 8 wherein receiving air flow data from a plurality of mass air flow sensors comprises:
   receiving air flow data from a first plurality of flow ports that create a differential air flow across one of the sensors to determine an angle of attack for the air vehicle; and
   receiving air flow data from a second plurality of flow ports to create a differential air flow across another of the sensors to determine an angle of sideslip for the air vehicle.

10. A method according to claim 9 wherein determining, using a controller, at least one of the angle of attack and the angle of sideslip for the air vehicle comprises determining an angle of attack for the air vehicle utilizing $V\alpha_1 - V\alpha_2$, which is a difference in the air mass flow entering $\alpha_1$ and $\alpha_2$ flow ports and proportional to an angle of attack for the air vehicle.

11. A method according to claim 9 wherein determining, using a controller, at least one of the angle of attack and the angle of sideslip for the air vehicle comprises determining an angle of sideslip for the air vehicle utilizing $V\beta_1 - V\beta_2$, which is a difference in the air mass flow entering $\beta_1$ and $\beta_2$ flow ports and proportional to an angle of sideslip for the air vehicle.

12. A method according to claim 9 wherein one of the flow ports is a total air mass flow port, and determining, using a controller comprises configuring the controller to determine an angle of attack for an air vehicle according to AOA $=(V\alpha_1 - V\alpha_2)/kV_{total}$, where $V\alpha_1 - V\alpha_2$ is a difference in the air mass flow entering the $\alpha_1$ and $\alpha_2$ flow ports, k is a function of the angle between the total flow port, $V_{total}$ and the individual $\alpha_1$ and $\alpha_2$ flow ports.

13. A method according to claim 9 wherein one of the flow ports is a total air mass flow port, and determining, using a controller comprises configuring the controller to determine an angle of sideslip for an air vehicle according to AOS $=(V\beta_1 - V\beta_2)/kV_{total}$, where $V\beta_1 - V\beta_2$ is a difference in the air mass flow entering the $\beta_1$ and $\beta_2$ flow ports, k is a function of the angle between the total flow port, $V_{total}$ and the individual $\beta_1$ and $\beta_2$ flow ports.

14. A method according to claim 8 further comprising:
   fabricating a number of flow ports on a surface; and
   positioning an air flow mass sensor within the airflow path.

15. An air flow mass sensor system comprising:
   a probe comprising a plurality of flow ports formed therein, a first plurality of said flow ports positioned to create a differential airflow therethrough based on an angle of attack of an air vehicle, a second plurality of said flow ports positioned to create a differential airflow therethrough based on an angle of sideslip of the air vehicle;
   a plurality of mass air flow sensors, a first of said mass air flow sensors positioned within a path created between said first plurality of said flow ports, a second of said mass air flow sensors positioned within a path created between said second plurality of said flow ports; and
   a controller configured to receive signals from said flow sensors and determine at least one of the angle of attack and the angle of sideslip for the air vehicle based on the differential air mass flows through said flow ports.

16. An air flow mass sensor system according to claim 15 wherein said controller is configured to determine an angle of attack utilizing $V\alpha_1 - V\alpha_2$, which is a difference in the air mass flow entering $\alpha_1$ and $\alpha_2$ flow ports and proportional to an angle of attack for an air vehicle.

17. An air flow mass sensor system according to claim 15 wherein said controller is configured to determine an angle of sideslip utilizing $V\beta_1 - V\beta_2$, which is a difference in the air mass flow entering $\beta_1$ and $\beta_2$ flow ports and proportional to an angle of sideslip for an air vehicle.

18. An air flow mass sensor system according to claim 15 wherein said controller is configured to determine an angle of attack according to AOA $=(V\alpha_1 - V\alpha_2)/k\ V_{total}$, where $V\alpha_1 - V\alpha_2$ is a difference in the air mass flow entering said flow ports $\alpha_1$ and $\alpha_2$, k is a function of the angle between a total flow port, $V_{total}$ and the individual $\alpha_1$ and $\alpha_2$ flow ports.

19. An air flow mass sensor system according to claim 15 wherein said controller is configured to determine an angle of attack according to AOS $=(V\beta_1 - V\beta_2)/kV_{total}$, where $V\beta_1 - V\beta_2$ is a difference in the air mass flow entering said flow ports $\beta_1$ and $\beta_2$, k is a function of the angle between the total flow port, $V_{total}$ and the individual $\beta_1$ and $\beta_2$ flow ports.

20. An air flow mass sensor system according to claim 15 wherein said probe comprises a hemispherical probe.

* * * * *